Patented May 11, 1937

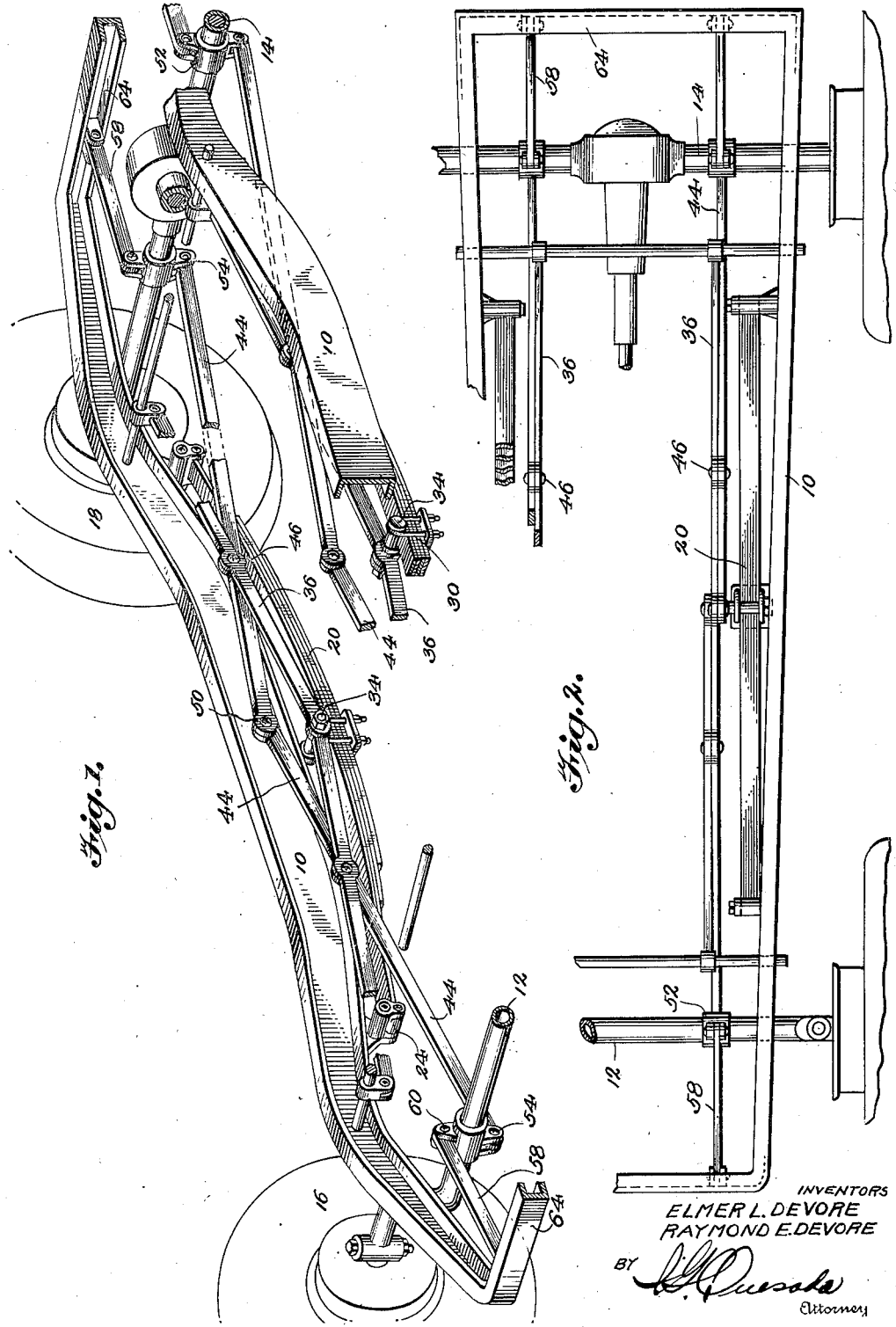

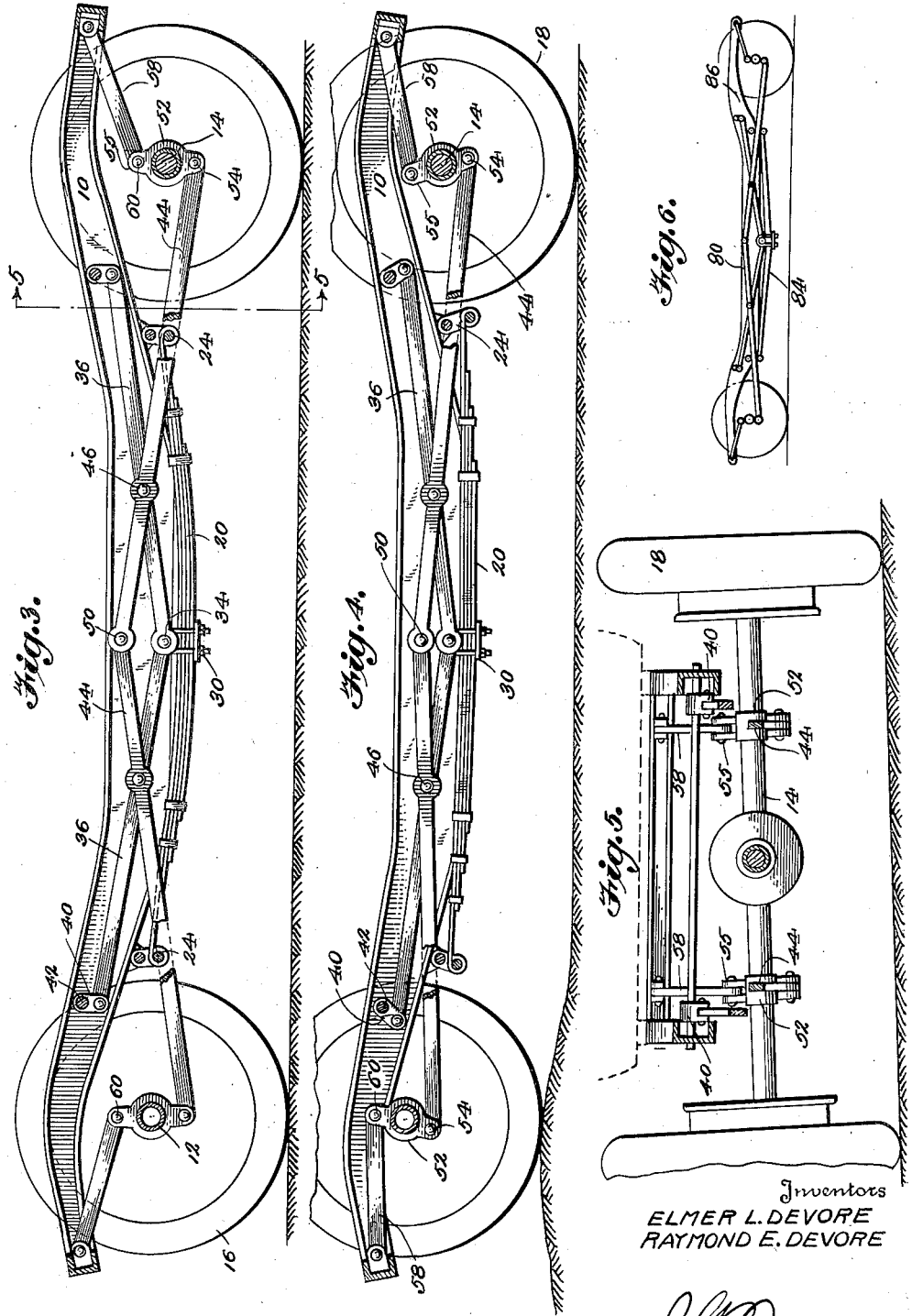

2,079,844

UNITED STATES PATENT OFFICE 2,079,844

VEHICLE

Elmer L. De Vore and Raymond E. De Vore, Meadville, Pa.

Application May 10, 1935, Serial No. 20,837

11 Claims. (Cl. 280—104)

This invention relates to vehicles, and more particularly to the suspension means therefor.

Briefly stated, the invention forming the subject of this application contemplates simple means by which the frame of a vehicle is held on an approximately even keel or in substantially the same horizontal plane against such contrary influences as inequalities in the roadbed and uneven load distribution.

For example, the invention looks to the provision of simple means by which the shock resulting from an abrupt upward or downward movement of but a single wheel, due, of course, to encountering an inequality in the roadbed, is distributed more or less uniformly throughout the frame of the vehicle, this being in contrast to conventional constructions in which that part of the frame immediately adjacent to the wheel which suffered the shock is subjected to abrupt raising or lowering.

Also, the invention will be found to provide for the mounting of the springs entirely between the ends of the frame allowing the springs to be concealed and entirely enclosed from dust and water, while at the same time providing for the constant and thorough lubrication of the springs.

Another advantage resides in the mounting of the springs between the ends of the frame which allows of a substantial increase in the length of the springs so as to provide a smoother spring action and one better able to absorb shocks.

In addition, the mounting of the springs between the ends of the frame avoids or overcomes several restrictions which hamper those seeking to improve the appearance of vehicles.

Since the suspension mechanism herein disclosed provides for the more or less uniform distribution of road shock and of the load, it will be seen that it is not necessary to mount the rear seat of the vehicle forwardly of the rear axle or near the center of the vehicle to obtain riding comfort, but on the contrary the rear seat of the vehicle may be placed directly over the rear axle or in the region thereof with an assurance that the occupants of such seat will enjoy substantially the same comfort as those in the front seat, allowing unlimited freedom in designing the seating arrangement of the vehicle.

Another attribute of the invention resides in the fact that if the vehicle is called upon to bear an uneven distribution of load, the suspension arrangement is such that the body of the car is nevertheless maintained approximately level or even, regardless of such uneven distribution of load or the inequalities that might be expected in the use of the vehicle.

Another object of the invention is to provide a suspension mechanism which may be incorporated in a motor vehicle without the necessity of elaborate changes in design and without adding to the cost of the vehicle.

Other objects and advantages will be apparent during the course of the following description.

In the accompanying drawings, forming a part of this application and in which like numerals are employed to designate like parts throughout the same, Figure 1 is a fragmentary sectional perspective of a motor vehicle chassis embodying the invention, Figure 2 is a fragmentary plan view of the structure shown in Figure 1, Figure 3 is a vertical longitudinal sectional view through the chassis, the parts being shown in relaxed position, Figure 4 is a similar view with the parts in the position occupied as the result of encountering an inequality in the roadway.

Figure 5 is a vertical transverse sectional view taken on line 5—5 of Figure 3,

Figure 6 is a side elevation disclosing a slight modification of the invention.

In the drawings, the numeral 10 designates an automobile frame and the numerals 12 and 14 designate the front and rear axles, respectively, of the vehicle. The front axle 12 has any suitable connection with the front wheels 16 while, of course, the rear axle 14 is located between and has connection with the rear wheels 18.

The invention forming the subject of this application contemplates the employment of what might be said to be the center springs 20 extending longitudinally at opposite sides of the longitudinal center of the frame 10 and in fact immediately inward of the sides of such frame. The terminal portions of the springs 20 have connection with shackles 24, the upper portions of which are pivotally suspended from hangers carried by the frame. The fact that the shackles 24 are pivotally suspended from the frame allows the springs to shift easily from one extreme position to the other. That is to say, the springs 20 are normally bowed as suggested in Figure 3, while when placed under an increased load, tend to straighten as suggested in Figure 4, in which event the shackles 24 swing on the pivotal mountings thereof.

However, at this point, it might be explained that the invention is not restricted to use in connection with leaf springs, but various other cushioning devices may be employed. For example, coil springs or pistons operating against a compressible fluid may serve in lieu of the leaf springs disclosed herein.

Referring now to Figure 1, it will be seen that the intermediate portions of the leaf springs 20 have connection with spring hangers 30 in the form of U-bolts which are, in turn, suspended from the projecting portions of the pivot elements 34. The pivot elements 34 extend through the overlapped inner terminal portions of levers 36 and the connection between the levers 36 and the pivot elements 34 is such that the levers may be rocked due to varying loads and shocks. When the levers 36 are thus rocked the associated springs 20 will be brought into play to absorb the shocks.

It is clearly illustrated in Figures 3 and 4, that the outer terminal portions of the levers 36 are pivotally suspended from the frame or pivotally associated with the frame through the employment of shackles 40 which shackles are, in turn, pivotally connected to the frame by stud elements 42.

From the foregoing, it is believed to be clear that flexing of the springs 20 is accompanied by a limited longitudinal movement of the associated levers, which limited longitudinal movement of the levers is allowed by the pivotal connection of these levers with the frame through the employment of the shackles 40.

It is further illustrated in Figures 3 and 4, that the intermediate portions of the levers 36 have pivotal connection with a second set of levers 44 through the intervention of pivotal elements 46.

The inner terminal portions of the levers 44 are overlapped and pivotally connected, as indicated at 50. On the other hand, the outer terminal portions of the levers 44 are pivotally connected to the lower arms or clevises of cranks 52, said connection being indicated by the numeral 54.

The cranks 52 are shown to be rotatably mounted upon the front and rear axles and are provided with upper arms or clevises 56 to which links 58 are pivotally connected as indicated at 60.

In carrying out the invention, the links 58 are extended longitudinally beyond the associated axles and have pivotal or rocking connection with cross members 64 carried by the terminal or outer portions of the frame.

The motion transmitting parts thus described co-act with the spring to distribute throughout the frame shocks to which particular portions of the vehicle are subjected.

For example, should a particular front wheel of the car encounter an abrupt bump in the road, that wheel will, of course, be moved upward and this exerts a forward pull on the associated rearwardly directed lever 44. The pulling force thus exerted on the forward lever 44 at one side of the frame will exert a corresponding pull on the associated rearwardly directed lever 44. The force thus applied to the associated levers 44 tends to bring these levers into a substantially straight line, moving the pivot element 50 downward.

This rocking of the levers 44 exerts an upward pulling force on the levers 36. This is true because of the connection 46 between the levers 44 and 36. When the levers 36 are thus subjected to an upward pulling force, the inner portions of the levers 36 and more particularly the pins 34 associated therewith are moved upward against the influence of the spring 20 with the result that the shock on one wheel is distributed throughout the length of the vehicle. That is to say, when a particular wheel is caused to rise abruptly the frame 10 is, in turn, brought downward as distinguished from the fact that in vehicles having the conventional spring arrangement, an upward force applied to a particular wheel results in an upward movement of the immediately adjacent part of the frame of the vehicle.

Since an abrupt rise or drop of a particular wheel results in an opposite movement of the frame, the disturbing force is thus neutralized holding the frame substantially level throughout its entire length.

It is important to observe that when the front wheel, for example, or any particular wheel of the vehicle is subjected to a shock and is caused to either rise or drop, the lever arrangement having connection with the frame at longitudinally spaced points will bring about a reaction in the frame, which will tend to neutralize the shock thus suffered by a particular wheel. That is to say, if the front of the frame is pulled downward to offset a certain rise in the front wheel due to a bump in the road, the rear portion of the frame will partake of a similar movement, holding the frame substantially level throughout its length. Thus, pitching or teetering of the vehicle body ordinarily due to encountering inequalities in the roadway is effectively avoided.

Since it is not necessary that the springs 20 extend beyond the axles, the frame of a car may be materially shortened allowing greater freedom in designing the vehicle, so far as concerns its appearance.

By using the large-sized center springs, as distinguished from the conventional four-spring arrangement, the springs may be made substantially longer than found in conventional constructions, and the springs may be concealed and enclosed from dust and water and constantly lubricated. The suspension of the car on two center springs avoids the need for employing several shackles and bushings heretofore found necessary in four spring arrangements, with the consequent elimination of the necessity of oiling these parts.

Incidentally, all parts that require lubrication are highly accessible and, of course, any means preferred may be employed for lubrication.

Should it happen that the load in the vehicle is somewhat unbalanced, being more on one side of the longitudinal center than on the other, the spring and lever arrangement compensates for this since it equally distributes the load throughout the frame. For example, if the rear corner of the frame as shown in Figure 1 is depressed, the adjacent cross or equalizing rod 64 will actuate both associated links 58 and thereby impart similar movements to the leverage arrangements at both sides of the frame. This, of course, uniformly depresses the entire frame and thus maintains the same approximately horizontal and level.

Since road shocks are equally distributed or transmitted to the frame through the length thereof it will be seen that it is not necessary to design the body of the car with the view of placing the rear passenger seat as far forward as possible. With this invention, any seating arrangement, either in the center or at the extreme ends of the frame or body will provide practically the same riding comfort as if the seats were positioned mid-way between the front and rear axles. It is the shock equalizing and compensating arrangement that makes this possible. In the arrangement disclosed, the length of movement of the wheel is greatly reduced before this movement reaches the spring so that the spring action is materially reduced and this, of course, looks to increased riding comfort.

In the form of invention disclosed in Figure 6, the lever arrangement 80 and the associated springs 84 are located laterally beyond the sides of the frame 86 as distinguished from the inside arrangement shown in Figures 1 to 5 inclusive.

The foregoing illustrates that the invention forming the subject of this application is capable of a variety of mechanical expressions and it is therefore to be understood that the forms of invention herewith shown and described are to be taken merely as preferred examples of the same and that such changes in arrangement and construction of parts may be made as will remain within the spirit of the invention and the scope of what is claimed.

Having thus described the invention what is claimed is:—

1. In a vehicle, a frame, wheels associated with the frame and having axles, springs extending longitudinally along the sides of the frame, means connecting the terminal portions of the springs to the frame for movement of the springs longitudinally with respect to the frame, levers pivotally connected to the intermediate portions of the spring, shackles pivotally connecting the levers to the frame, a second set of levers pivotally connected at the meeting portions thereof with each other, means pivotally connecting the intermediate portions of the first-named levers to the second-named levers, and cranks connecting the axles to said second-named levers.

2. In a vehicle, a frame, wheels associated with the frame and having axles, springs extending longitudinally along the sides of the frame, means connecting the terminal portions of the springs to the frame for movement of the springs longitudinally with respect to the frame, levers pivotally connected to the intermediate portions of the spring, shackles pivotally connecting the levers to the frame, a second set of levers pivotally connected at the meeting portions thereof with each other, means pivotally connecting the intermediate portions of the first-named levers to the second-named levers, cranks connecting the axles to said second named levers, and links pivotally connecting the frame to said axles.

3. In a vehicle, a frame, wheels associated with the frame and having axles, cranks rotatably mounted on the axles, levers pivotally connected to said cranks, means pivotally connecting the inner portions of the levers, a second set of levers pivotally connected to the frame, means pivotally connecting the inner portions of the second named levers, springs connected to said means, shackles connecting the ends of the springs to said frame, and pivot elements connecting the intermediate portions of the first-named levers to the intermediate portions of the second-named levers.

4. In a vehicle, a frame, wheels associated with the frame, axles between the wheels, cranks rotatably mounted on the axles, levers pivotally connected to said cranks, means pivotally connecting the inner portions of the levers, a second set of levers pivotally connected to the frame, means pivotally connecting the inner portions of the second named levers, springs connected to said means, shackles connecting the ends of the springs to said frame, pivot elements connecting the intermediate portions of the first named levers to the intermediate portions of the second named levers, and links pivotally connected to said cranks and said frame at points beyond the axles.

5. In a vehicle, a frame, wheels associated with the frame, axles between the wheels, cranks rotatably mounted on the axles, levers pivotally connected to said cranks, means pivotally connecting the inner portions of the levers, a second set of levers pivotally connected to the frame, means pivotally connecting the inner portions of the second named levers, springs connected to said means, shackles connecting the ends of the springs to said frame, pivot elements connecting the intermediate portions of the first named levers to the intermediate portions of the second named levers, and links pivotally connected to said cranks and said frame at points beyond the axle, said springs being located substantial distances inward of the ends of the frame.

6. In a vehicle, a frame, wheels associated with said frame and having axles, levers pivotally connected to said axles, means pivotally connecting the inner portions of said levers, a second set of levers pivotally connected to said frame, means pivotally connecting the inner portions of the second named levers, and pivotal elements connecting the intermediate portions of said first named levers to the intermediate portions of said second named levers.

7. In a vehicle, a frame, wheels associated with said frame and having axles, levers pivotally connected to said axles, means pivotally connecting the inner portions of said levers, a second set of levers pivotally connected to said frame, means pivotally connecting the inner portions of the second named levers, and pivotal elements connecting the intermediate portions of said first named levers to the intermediate portions of said second named levers, and springs associated with said second named levers and connected to said frame.

8. In a vehicle, a frame, wheels associated with said frame and having axles, cranks rotatably mounted on said axles, levers pivotally connected to said cranks, means pivotally connecting the inner portions of said levers, links pivotally connected to said cranks and to said frame at points beyond said axles, a second set of levers pivotally connected to said frame, means pivotally connecting the inner portions of the second named levers, and pivot elements connecting the intermediate portions of said first named levers to the intermediate portions of said second named levers.

9. In a vehicle, a frame, axles associated with said frame, levers having means connecting the same to said wheels, means pivotally connecting the levers, a second set of levers pivotally connected to said frame, means pivotally connecting the second-named levers, and means pivotally joining the levers of the first-named levers with the individual levers of the second-named levers.

10. In a vehicle, a frame, spaced axles, a set of levers extending longitudinally of said frame and connected to said axles, means pivotally connecting said levers, a second set of levers pivotally connected to said frame and crossing the individual levers of said first-named set of levers and pivotally joined thereto, means pivotally connecting the individual levers of said second-named set of levers, and shock absorbing means associated with one of said sets of levers.

11. In a vehicle, a frame, spaced axles, a set of levers extending longitudinally of said frame and connected to said axles, means pivotally connecting said levers, a second set of levers pivotally connected to said frame and crossing the individual levers of said first-named set of levers and pivotally joined thereto, means pivotally connecting the individual levers of said second-named set of levers, and springs associated with one of said sets of levers and connected to the means pivotally connecting the individual levers of that set of levers.

ELMER L. DE VORE.
RAYMOND E. DE VORE.